(12) United States Patent
Conger et al.

(10) Patent No.: US 10,641,354 B1
(45) Date of Patent: *May 5, 2020

(54) COMPOSITE DRIVE SHAFT DAMPER

(71) Applicant: Caraustar Industrial and Consumer Products Group, Inc., Austell, GA (US)

(72) Inventors: Gary A. Conger, Hemlock, MI (US); Peter T. Tkacik, Fort Mill, SC (US); Martin H. Stark, Saginaw, MI (US); David A. Galonska, Saginaw, MI (US); Josh Wolfenbarger, Ida, MI (US)

(73) Assignee: Caraustar Industrial and Consumer Products Group, Inc., Austell, GA (US)

( * ) Notice: Subject to any disclaimer, the term of this patent is extended or adjusted under 35 U.S.C. 154(b) by 538 days.

This patent is subject to a terminal disclaimer.

(21) Appl. No.: 14/585,859

(22) Filed: Dec. 30, 2014

Related U.S. Application Data

(60) Continuation-in-part of application No. 14/317,636, filed on Jun. 27, 2014, now Pat. No. 9,599,147, which is a division of application No. 13/681,851, filed on Nov. 20, 2012, now Pat. No. 8,801,526, which is a continuation-in-part of application No. 12/650,763, filed on Dec. 31, 2009, now abandoned.

(60) Provisional application No. 61/922,562, filed on Dec. 31, 2013, provisional application No. 61/141,952, filed on Dec. 31, 2008, provisional application No. 61/143,610, filed on Jan. 9, 2009.

(51) Int. Cl.
*F16F 15/12* (2006.01)
*F16C 3/02* (2006.01)

(52) U.S. Cl.
CPC ............. *F16F 15/12* (2013.01); *F16C 3/02* (2013.01); *F16C 2326/06* (2013.01)

(58) Field of Classification Search
CPC .................. Y10T 464/50; F16C 2326/06
See application file for complete search history.

(56) References Cited

U.S. PATENT DOCUMENTS

| | | | |
|---|---|---|---|
| 3,075,406 | A | 7/1961 | Butler, Jr. et al. |
| 3,430,543 | A | 3/1969 | Cunningham |
| 4,331,305 | A | 5/1982 | Marquis et al. |
| 4,454,734 | A | 6/1984 | Marquis et al. |
| 4,507,351 | A | 3/1985 | Johnson et al. |
| 4,621,508 | A | 11/1986 | Baxley, Jr. et al. |
| 4,909,361 | A | 3/1990 | Stark et al. |
| 5,094,404 | A | 3/1992 | BesRosiers et al. |
| 5,331,737 | A | 7/1994 | Jarvela |
| 5,571,883 | A | 11/1996 | Jourdain et al. |
| 5,643,093 | A | 7/1997 | Breese |
| 5,673,437 | A | 10/1997 | Chase et al. |

(Continued)

FOREIGN PATENT DOCUMENTS

WO 2008/005863 A2 1/2008

OTHER PUBLICATIONS

Higgins, R. A., "Properties of Engineering Materials," 2nd ed. Industrial Press Inc., 1994, p. 314.

(Continued)

*Primary Examiner* — Matthieu F Setliff
(74) *Attorney, Agent, or Firm* — Additon, Higgins & Pendleton, P.A.

(57) ABSTRACT

A composite drive shaft damper includes both foamed and non-foamed NVH-reducing materials to dampen particular NVH-causing frequencies within a drive shaft.

21 Claims, 15 Drawing Sheets

(56) References Cited

U.S. PATENT DOCUMENTS

| | | |
|---|---|---|
| 5,699,683 A | 12/1997 | Rieker |
| 5,904,622 A | 5/1999 | Breese et al. |
| 5,924,531 A | 7/1999 | Stark et al. |
| 5,976,021 A | 11/1999 | Stark et al. |
| 6,234,911 B1 | 5/2001 | Breese et al. |
| 6,247,346 B1 | 6/2001 | Dickson, Jr. |
| 6,370,756 B1 | 4/2002 | Conger et al. |
| 6,520,678 B2 | 2/2003 | Aiken et al. |
| 6,662,423 B2 | 12/2003 | Menosky et al. |
| 6,719,230 B2 | 4/2004 | Baranov et al. |
| 6,752,722 B2 | 6/2004 | Armitage et al. |
| 6,854,685 B2 | 2/2005 | Couchey |
| 7,083,523 B2 | 8/2006 | Haile et al. |
| 7,774,911 B2 | 8/2010 | Sun et al. |
| 8,176,613 B2 | 5/2012 | Sun et al. |
| 8,528,180 B2 | 9/2013 | Sun et al. |
| 8,801,526 B1 | 8/2014 | Conger et al. |
| 8,832,941 B1 | 9/2014 | Pennington et al. |
| 8,863,390 B1 | 10/2014 | Ley et al. |
| 9,033,807 B1 | 5/2015 | Ley et al. |
| 9,175,718 B1 | 11/2015 | Ley et al. |
| 9,599,147 B1 | 3/2017 | Conger et al. |
| 9,890,808 B2 | 2/2018 | Wang |
| 9,933,020 B2 | 4/2018 | Leko et al. |
| 10,018,244 B2 | 7/2018 | Ley et al. |
| 2005/0049054 A1 | 3/2005 | Laskey |
| 2007/0087848 A1 | 4/2007 | Larsen et al. |
| 2009/0005183 A1 | 1/2009 | Baumhauer et al. |
| 2009/0015913 A1 | 1/2009 | Bratt et al. |
| 2009/0048031 A1 | 2/2009 | Conger et al. |
| 2018/0313428 A1 | 11/2018 | Ley et al. |

OTHER PUBLICATIONS

Dow Corning, Product information on Dow Corning's 3-8186 Thixotropic Foam, Midland, MI (1997), pp. 1-2.

Dow Corning, Material Safety Data Sheet, Dow Corning(R) 3-8186 Thixotropic Foam Part B, Midland, MI, pp. 1-7, Feb. 6, 2002.

Dow Corning, Material Safety Data Sheet, Dow Corning(R) 3-8186 Thixotropic Foam Base, Midland, MI, pp. 1-7, Sep. 26, 2002.

Siversten, Katrine, Polymer Foams, Spring 2007, Massachusetts Institute of Technology, Polymer Physics 3.063, pp. 1-17 [in parent U.S. Appl. No. 12/650,763].

A & D Rubber Products Company [online] Dec. 17, 2003 {retrieved on Aug. 12, 2009} Retrieved from the Internet: URL http://web.archive org/web/20031217073911/http://adrubber.com/materials.html, pp. 1-5 [in parent U.S. Appl. No. 12/650,763].

International Search Report and Written Opinion in commonly owned International Application No. PCT/US2007/072529 dated Aug. 5, 2008.

International Preliminary Report on Patentability in commonly owned International Application No. PCT/US2007/072529 dated Jan. 6, 2009.

Sun, Zhaohui et al., "Attenuation of Driveline Vibrations through Tuning of Propeller Shaft Liners", SAE International, May 17, 2011, pp. 1-8.

Ley, Jason et al., "Optimization of Propshaft Liner Tuning and Damping: A SYLENT Approach", SAE International, Jun. 15, 2015, pp. 1-5.

ABSORBER w/BARRIER

COMPOSITE DRIVE SHAFT DAMPER

CROSS-REFERENCE TO PRIORITY APPLICATIONS

This application is a continuation-in-part of commonly assigned U.S. application Ser. No. 14/317,636 for a Drive Shaft Damper, (filed Jun. 27, 2014), now U.S. Pat. No. 9,599,147, which is a division of commonly assigned U.S. patent application Ser. No. 13/681,851 for a Foamed Drive Shaft Damper, (filed Nov. 20, 2012), now U.S. Pat. No. 8,801,526, which itself is a continuation-in-part of commonly assigned U.S. patent application Ser. No. 12/650,763 for a Foamed Drive Shaft Damper (filed Dec. 31, 2009), now abandoned, which itself claims the benefit of U.S. Patent Application No. 61/141,952 for a Foamed Drive Shaft Damper (filed Dec. 31, 2008), and U.S. Patent Application No. 61/143,610 for a Foamed Drive Shaft Damper (filed Jan. 9, 2009). The foregoing commonly assigned patent and patent applications are hereby incorporated by reference in their entirety.

This application also claims the benefit of U.S. Patent Application No. 61/922,562 for a Composite Drive Shaft Damper (filed Dec. 31, 2013), which is hereby incorporated by reference in its entirety.

FIELD OF THE INVENTION

The invention relates to a composite drive shaft damper adapted for use in a hollow automotive drive shaft to dampen vibrations and attenuate sound in vehicles, such as cars, trucks, tractors, and heavy machinery.

BACKGROUND

An automobile conventionally employs a hollow, tubular drive shaft to transmit torque from the transmission to the differential gears. Such drive shafts often produce annoying NVH (i.e., noise, vibration, and harshness). Accordingly, it is desirable to dampen NVH to provide for a quieter and smoother ride. Furthermore, it is desirable to prevent vibration to avoid mechanical failure from the loosening of assembled vehicle parts.

Several commonly assigned patents address NVH reduction. For example, U.S. Pat. No. 4,909,361 to Stark et al. discloses a drive shaft damper having a base tube or core formed of helically wound paper. A helical retaining strip, such as ethylene propylene diene monomer rubber (i.e., EPDM), is fixed to the core to engage the bore of the drive shaft.

Another example is U.S. Pat. No. 5,976,021 to Stark et al. U.S. Pat. No. 5,976,021 improves the drive shaft damper disclosed in U.S. Pat. No. 4,909,361 by including sealed ends and an innermost layer of waterproof material, such as aluminum foil.

Yet another example is U.S. Pat. No. 5,924,531 to Stark et al. U.S. Pat. No. 5,924,531 discloses a vibration damping shaft liner having a cylindrical core and a corrugated layer wound around the core in alternating helical grooves and flutes.

Each of the above-referenced patents is hereby incorporated by reference in its entirety.

The drive shaft dampers disclosed in the foregoing, commonly assigned patents are well suited for their intended purposes. That notwithstanding, there remains a need for drive shaft dampers that better reduce problematic NVH in particular drive shafts as installed in particular vehicles.

SUMMARY

The invention embraces a composite drive shaft damper that includes both foamed and non-foamed NVH-reducing materials to dampen particular NVH-causing frequencies within a drive shaft. An exemplary NVH-reducing, composite drive shaft damper has both foam and one or more non-foamed retaining members secured to the outside surface of a substantially cylindrical structure, such as a paperboard tube. An exemplary NVH-reducing, composite drive shaft damper can be frictionally secured within a tubular drive shaft to provide a vehicle with a dampened drive shaft.

The foregoing illustrative summary, as well as other exemplary objectives and/or advantages of the invention, and the manner in which the same are accomplished, are further explained within the following detailed description and its accompanying drawings.

DETAILED DESCRIPTION

The invention embraces a composite, tubular drive shaft damper having both foam (e.g., an elastomeric foam) and non-foamed NVH-reducing retaining member(s) (e.g., EPDM or heat-resistant silicone rubber) applied to the inner and/or outer surfaces of a substantially cylindrical substrate tube, thereby providing superior NVH-reduction properties.

In this regard, the foam and non-foamed NVH-reducing retaining member(s) may be adhesively bonded or otherwise secured to the substrate tube (e.g., the exterior surface of a paperboard tube).

Figure 1:
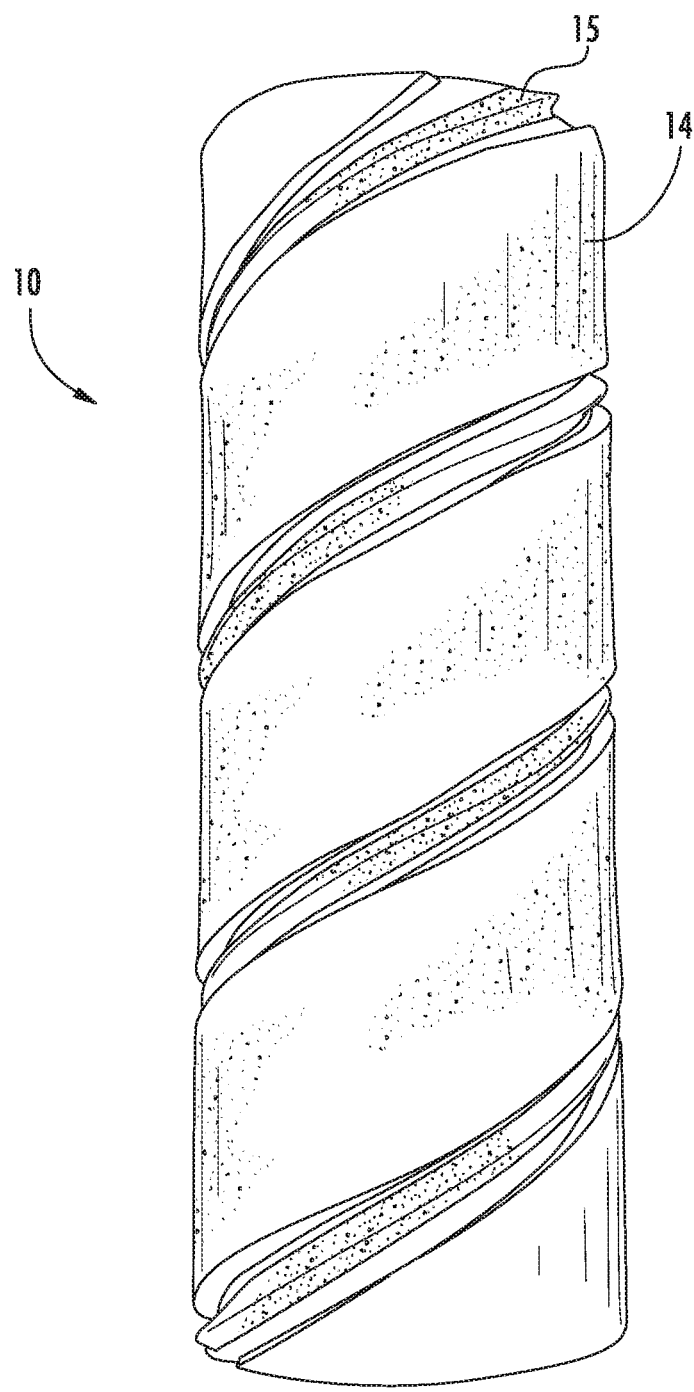
FIG. 1 schematically depicts an exemplary composite drive shaft damper that includes exterior, non-foamed retaining members and exterior foam.
Figure 1A:
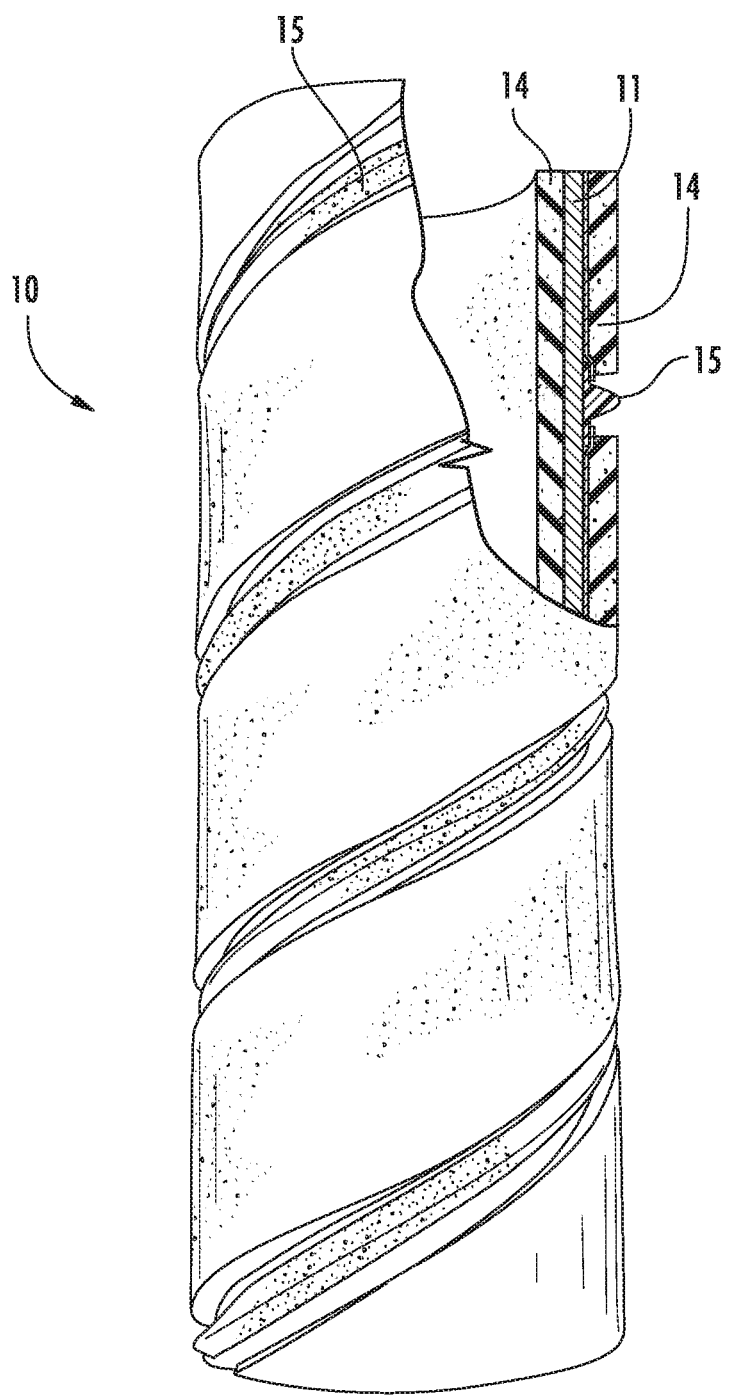
FIGS. 1A and 1B schematically depict exemplary composite drive shaft dampers that include exterior, non-foamed retaining members and both interior and exterior foam.
Figure 1B:
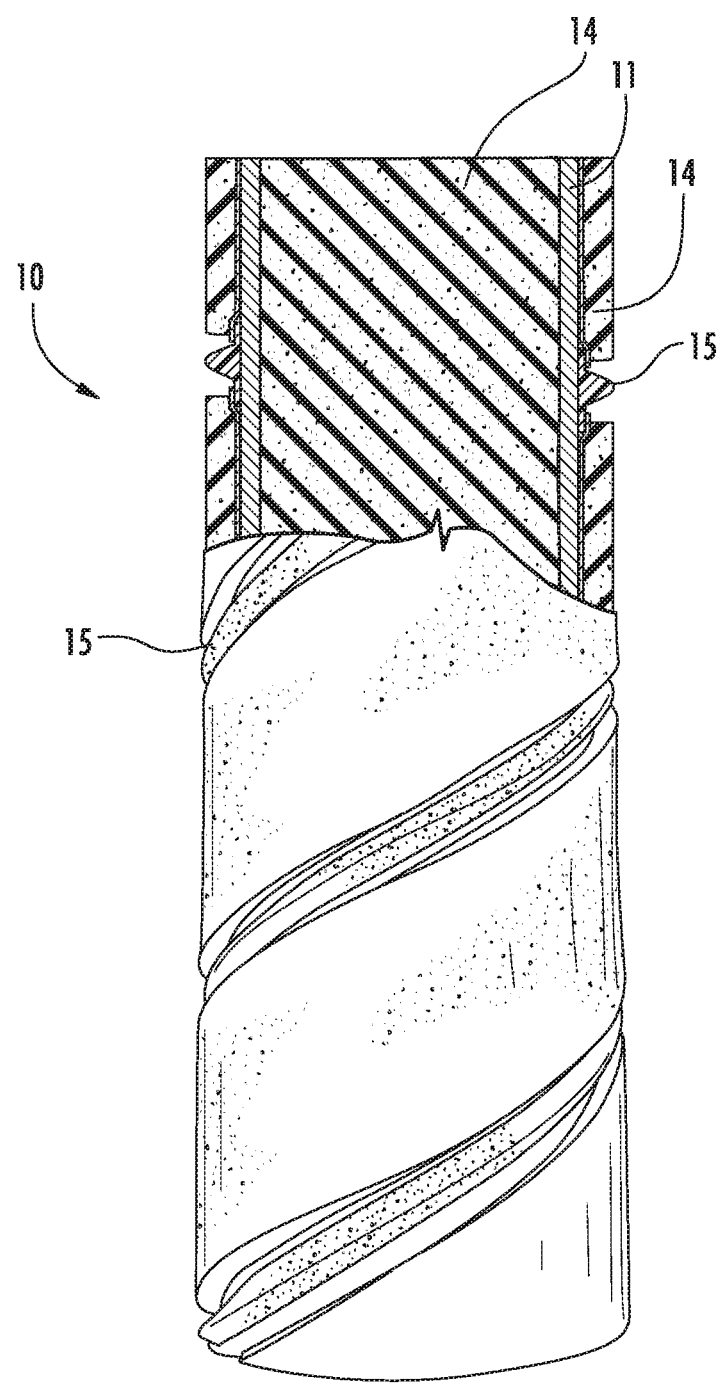

In this regard, the non-foamed NVH-reducing retaining member(s) are typically secured to the exterior surface of the substantially cylindrical substrate tube. The foam may be secured to one or both surfaces of the substantially cylindrical substrate tube (i.e., the interior surface and/or exterior surface). An exemplary composite drive shaft damper, which includes both surficial foam and surficial rubber retaining members on a paperboard tube, is depicted in FIG. 1.

Figure 2:
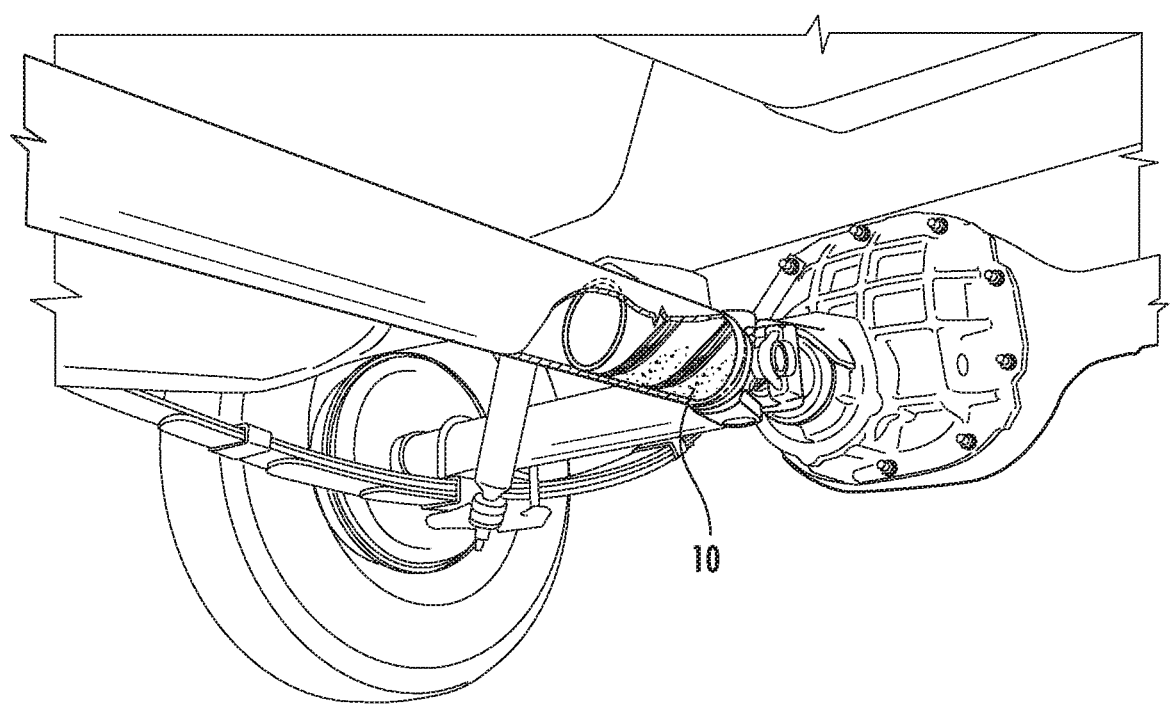
FIG. 2 schematically depicts an exemplary vehicle comprising an exemplary drive shaft damper.

The invention further embraces a dampened hollow drive shaft having the composite drive shaft damper 10 frictionally positioned therein, both alone and as installed in a vehicle as depicted in FIG. 2.

An exemplary composite drive shaft damper is formed of a substantially cylindrical structure, such as a convolute tube or, more typically, a spirally wound tube. See FIGS. 3A-3B. The substantially cylindrical structure itself is typically formed of fibrous material, such as paper or other polymeric material. As noted, the substantially cylindrical structure has both foamed and non-foamed materials (e.g., a non-foamed NVH-reducing retaining member) applied to its surface(s). Thus, it is herein referred to as a "composite drive shaft damper."

The substantially cylindrical structure of the drive shaft damper is typically made up of one or more spirally wound plies. These plies may be configured to form seam gap joints, butt joints, and/or overlap joints. See FIGS. 4A-4C. The spirally wound plies may also include one or more moisture-resistant layers. In addition, the spirally wound plies may include one or more adhesive layers positioned between adjacent plies so that adjacent plies are affixed to one another.

Figure 5:
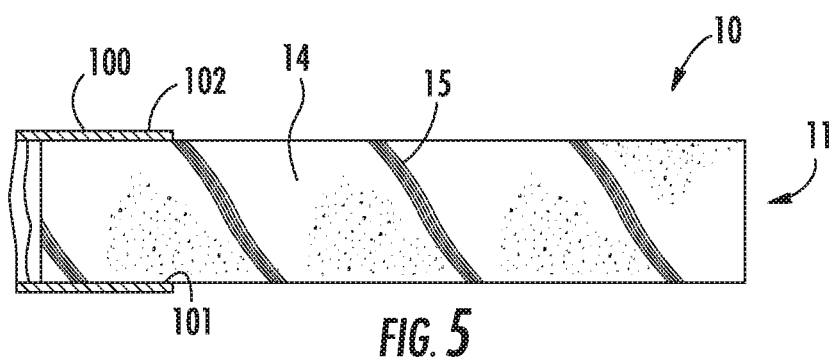
FIG. 5 schematically depicts an exemplary drive shaft damper having helical, non-foamed retaining member(s) and exterior foam.

FIG. 5 depicts an exemplary composite drive shaft damper 10 positioned within a tubular drive shaft 100. The drive shaft 100 has an inner surface 101 and an outer surface 102. The composite drive shaft damper 10 is partly characterized by its substantially cylindrical structure 11. Thus, the outer surface of the substantially cylindrical structure 11 is positioned adjacent to the inner surface 101 of the drive shaft 100.

Figure 3A:
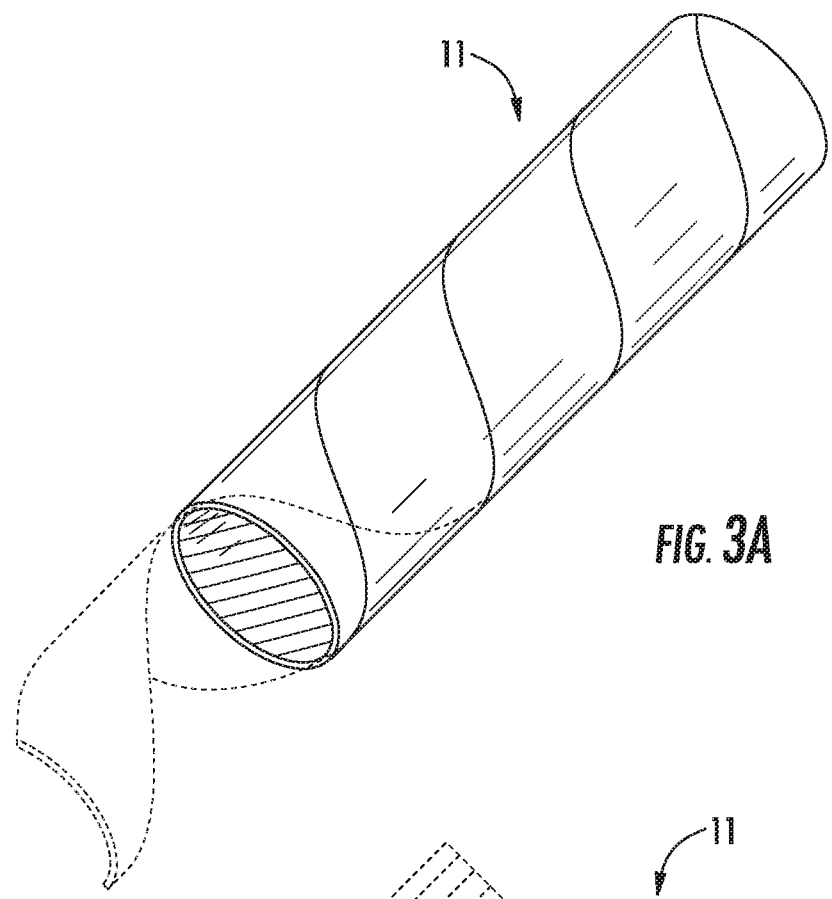
FIGS. 3A-3B schematically depict exemplary substantially cylindrical structures.
Figure 4A:
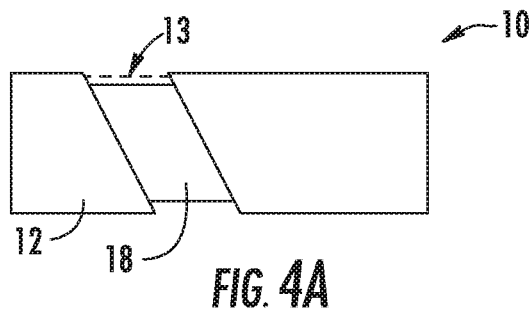
FIGS. 4A-4C schematically depict respective sections of exemplary drive shaft dampers.
Figure 4B:
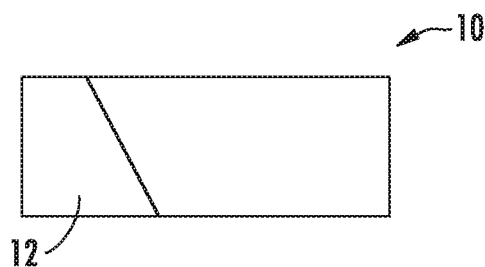
Figure 4C:
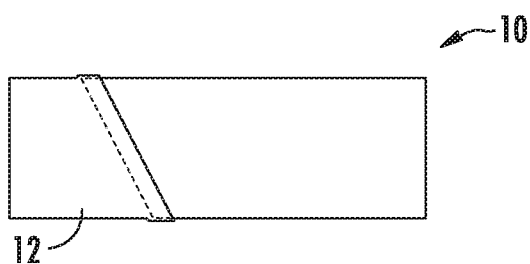

In this exemplary embodiment, the substantially cylindrical structure 11 of the composite drive shaft damper 10 is formed by several layers of spirally wound plies 12. This is depicted in FIGS. 4A-4C. Adjacent spirally wound plies may be bound together by respective adhesive layers 13. That is, an adhesive layer 13 is positioned between adjacent spirally wound plies 12. The strip comprising the outermost ply typically has both foam 14 and one or more non-foamed retaining members 15 applied to its outer surface. For instance, each ply may be formed from a 2-inch to 6-inch strip of spirally wound paperboard. See FIGS. 3A and 4A.

In one embodiment of the composite drive shaft damper, the substantially cylindrical structure 11 includes at least one ply of corrugated paper or paperboard (e.g., one or more single-faced corrugated plies). See FIGS. 3A-3B.

In another embodiment of the composite drive shaft damper, the substantially cylindrical structure 11 includes an outermost layer of corrugated paper or paperboard.

In yet another embodiment, the substantially cylindrical structure 11 includes an outermost layer of non-corrugated paperboard (i.e., having a smooth surface). Surprisingly, it has been observed that a drive shaft damper configuration in which the outermost layer is formed of smooth-surface paperboard seems to have better noise attenuation as compared with a configuration in which the outermost layer is formed of corrugated paperboard.

FIG. 4A depicts an outermost spirally wound ply 12 forming a seam gap joint 18 formed along the entire length of the substantially cylindrical structure 11. In this configuration, a retaining member 15 (e.g., a non-foamed, NVH-reducing retaining member) is positioned between the spiral seam gap joint 18 formed by the outermost spirally wound ply 12. A portion of the retaining member 15 is positioned beneath the outermost spirally wound ply 12. Those having ordinary skill in the art will appreciate that the seam gap joint 18 may be formed by one or more spirally wound plies 12.

Although the retaining member 15 is typically positioned between a seam gap joint 18 of the substantially cylindrical structure 11 (i.e., a spirally wound tube), the retaining member 15 can simply be affixed to the outside surface of the substantially cylindrical structure 11. In such embodiments, the substantially cylindrical structure 11 can be, for example, a spirally wound tube, a convolute tube (e.g., using one or more convolute plies), or an extruded tube.

As shown in FIG. 1, an exemplary, composite drive shaft damper employs a spirally wound paperboard tube as the substantially cylindrical structure. Here, two rubber retaining members 15 are helically affixed to the substantially cylindrical structure (i.e., applied in parallel in a two-start configuration) along the entire length of the substantially cylindrical structure. Foam 14 is secured to the substantially cylindrical structure between the adjacent helical retaining members 15 to substantially cover the outer surface between the adjacent, parallel helical retaining members 15. The foam 14 may be adhesively bonded or otherwise secured in a helical strip to the outer surface of the paperboard tube. Alternatively, the foam can be extruded (e.g., as one of more beads) onto the outer surface of the substantially cylindrical structure in areas not already covered by a retaining member 15.

As noted, it is within the scope of the present invention to adhesively bond or otherwise secure foam to the inner surface of the substantially cylindrical structure, either with or without the presence of exterior, surficial foam. In this regard, substantially the entire annular space formed by the substantially cylindrical structure may be filled with foam.

The retaining members may be formed of a polymeric material, such as ethylene propylene diene monomer rubber (e.g., EPDM having a Shore A hardness of between about 50 and 60) or a blend thereof. Alternatively, for improved heat resistance, the retaining members may be formed of silicone-containing polymeric material, such as silicone rubber, employed alone or with other materials. A silicone rubber that is suitable for forming heat-resistant retaining members is available from Timco Rubber Products, Inc. as 50 DUROMETER SILICONE. In this regard, this application incorporates entirely by reference the following commonly assigned patent applications and patent application publications: International Patent Application No. PCT/US07/72529 for Heat-Resistant Drive Shaft Damper Having Improved Dampening Performance, filed Jun. 29, 2007 (and published Jan. 10, 2008, as Publication No. WO 2008/005863 A2), and its continuation, U.S. patent application Ser. No. 12/256,553 for Heat-Resistant Drive Shaft Damper Having Improved Dampening Performance, filed Oct. 23, 2008 (and published Feb. 19, 2009, as Publication No. 2009/0048031 A1). This application also incorporates entirely by reference U.S. Pat. Nos. 5,904,622 and 6,234,911.

The foam may be an elastomeric foam, such as polyurethane and/or polyether foam. For heat resistance, the foam may be formed of a foamed silicone that has high-temperature resistance. A suitable silicone for forming heat-resistant foam is Dow Corning's 3-8186 Thixotropic Foam. In this regard and as noted, this application incorporates entirely by reference U.S. patent application Ser. No. 13/681,851 for a Foamed Drive Shaft Damper (filed Nov. 20, 2012), U.S. patent application Ser. No. 12/650,763 for a Foamed Drive Shaft Damper (filed Dec. 31, 2009), U.S. Patent Application No. 61/141,952 for a Foamed Drive Shaft Damper (filed Dec. 31, 2008), and U.S. Patent Application No. 61/143,610 for a Foamed Drive Shaft Damper (filed Jan. 9, 2009). U.S. Patent Application Nos. 61/141,952 and 61/143,610 disclose additional product information, including an MSDS, with respect to Dow Corning's 3-8186 Thixotropic Foam.

As disclosed in commonly assigned U.S. patent application Ser. No. 13/681,851, polyether foam (e.g., charcoal polyether foam) provides enhanced dampening characteristics. Alternative foam materials (e.g., for forming an open-cell foam) include polyester foam, polyurethane foam, and silicone foam. With respect to the present composite drive shaft dampers, suitable foams (e.g., charcoal polyether foam) typically have (i) a density of between about 1.0 lb/ft$^3$ and 3.5 lbs/ft$^3$ (e.g., between about 1.05 lbs/ft$^3$ and 1.15 lbs/ft$^3$), typically at least about 1.5 lbs/ft$^3$ (e.g., between about 1.75 lbs/ft$^3$ and 3.0 lbs/ft$^3$), (ii) an indent-force deflection at 25 percent of between about 28 psi and 36 psi, (iii) a tensile strength of at least about 10 psi, (iv) a tear strength of at least about 1.0 psi, and (v) a minimum elongation of at least about 100 percent.

When installed on a substantially cylindrical structure, the foam typically has a thickness of between about 0.25 inch and 2.0 inches. By way of illustration, a suitable cylindrical structure may be a paperboard tube having (i) a length of between about 8 inches and 52 inches (e.g., between about 12 inches and 16 inches), (ii) a paper density of between about 3.3 lbs/1000 ft$^2$ and 3.7 lbs/1000 ft$^2$, and (iii) a tube wall thickness of between about 0.04 inch and 0.09 inch.

Although the foam 14 and non-foamed retaining member(s) 15 are typically spirally positioned upon the surface of the substantially cylindrical structure 11 (e.g., a paperboard tube) as depicted in FIG. 1, it is within the scope of the present invention to apply both the foam 14 and the non-foamed retaining member(s) 15 in other, non-helical configurations.

Figure 6:
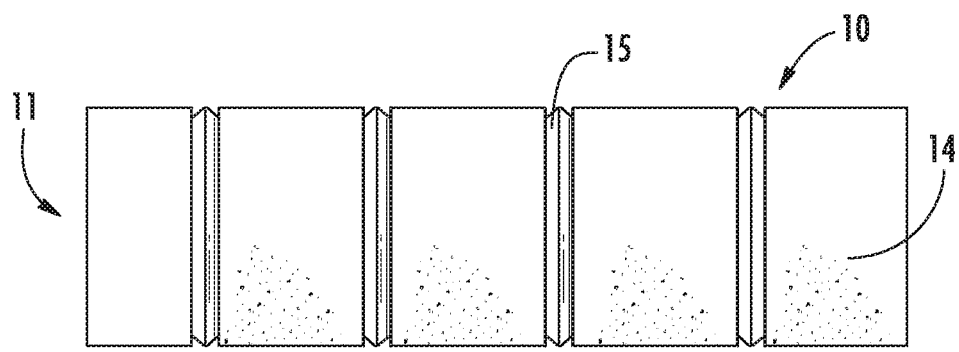
FIG. 6 schematically depicts an exemplary drive shaft damper having circumferentially positioned non-foamed retaining members and exterior foam.

In one embodiment of the composite drive shaft damper 10, non-foamed retaining members 15 are circumferentially positioned about the substantially cylindrical structure 11, and foam 14 is adhesively bonded or otherwise secured to the outer surface (and/or the inner surface) of the substantially cylindrical structure 11 in areas not covered by a retaining member 15. See FIG. 6.

Figure 7:
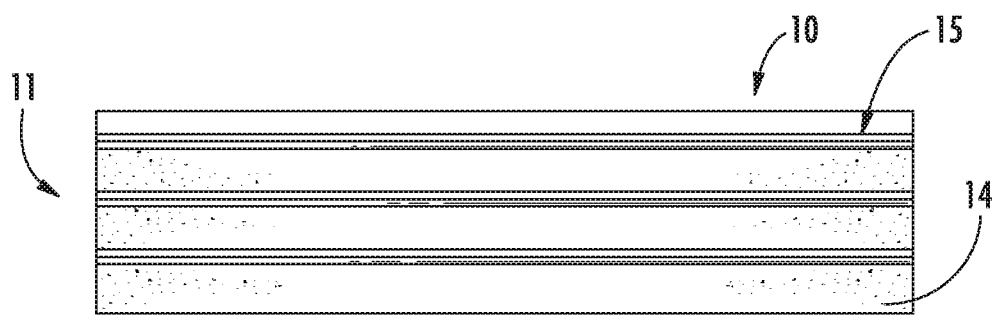
FIG. 7 schematically depicts an exemplary drive shaft damper having axially positioned non-foamed retaining members and exterior foam.

In another embodiment of the composite drive shaft damper 10, non-foamed retaining members 15 are positioned substantially parallel to the central axis of the substantially cylindrical structure 11 (i.e., longitudinally along the substantially cylindrical structure 11), and foam 14 is adhesively bonded or otherwise secured to the outer surface (and/or the inner surface) of the substantially cylindrical structure 11 in areas not covered by a retaining member 15. See FIG. 7.

Figure 8:
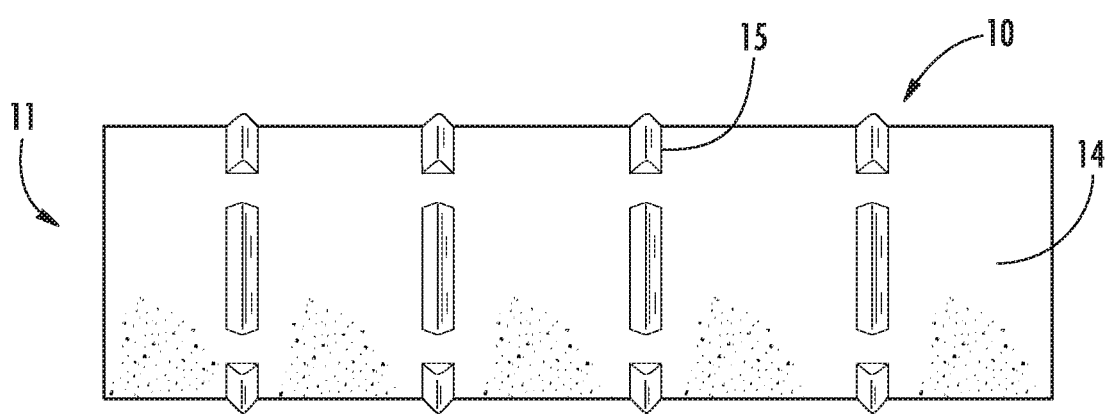
FIG. 8 schematically depicts an exemplary drive shaft damper having intermittently positioned non-foamed retaining members and exterior foam.

In another embodiment of the composite drive shaft damper 10, non-foamed retaining members 15 are positioned intermittently throughout the outer surface of the substantially cylindrical structure 11, and foam 14 is adhesively bonded or otherwise secured to the outer surface (and/or the inner surface) of the substantially cylindrical structure 11 in areas not covered by a retaining member 15. See FIG. 8.

In any of these foregoing configurations, the foam 14 and the retaining member(s) 15 are typically secured (e.g., bonded) to the substantially cylindrical structure 11 using adhesive to ensure durability during drive shaft manufacture and subsequent use.

Figure 3B:
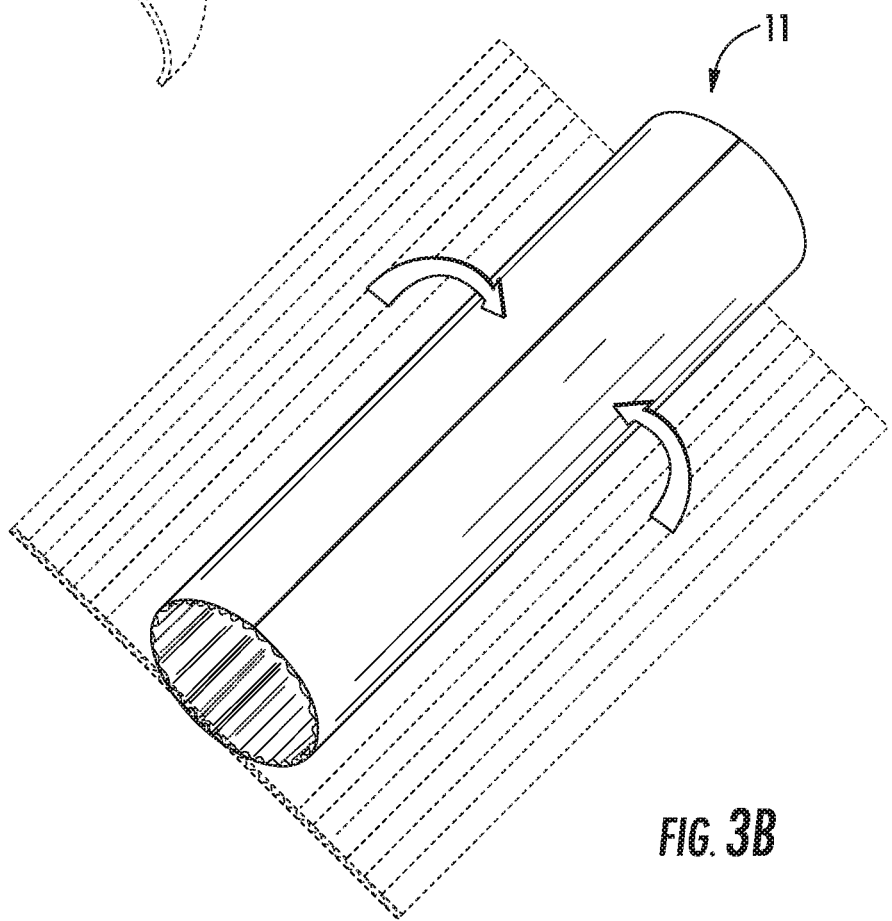
Figures 9A, 9B:
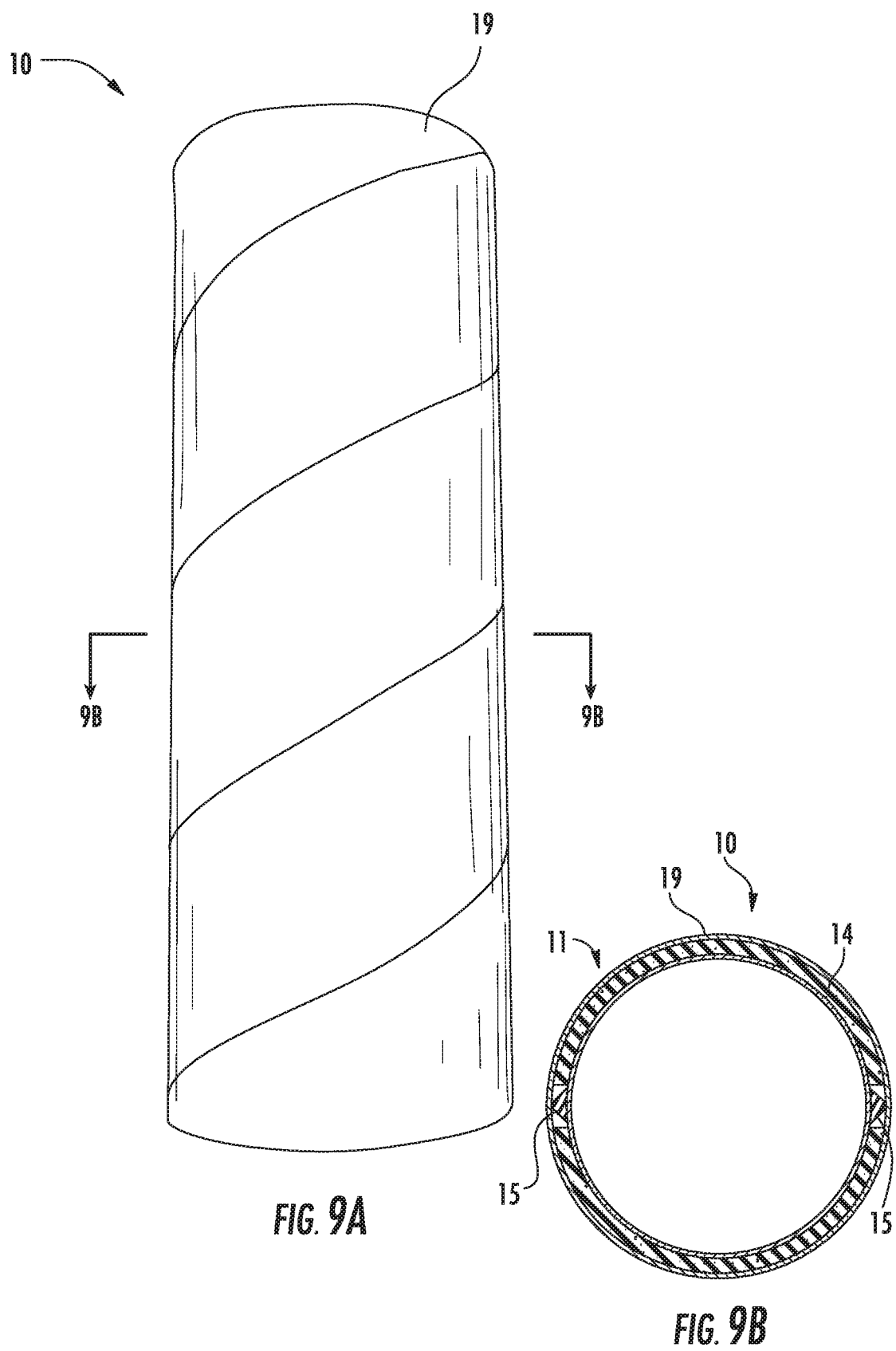
FIGS. 9A-9B schematically depict an exemplary composite drive shaft damper that includes exterior, non-foamed retaining members and exterior foam sandwiched between a cylindrical substrate tube and one or more wrapping layers.
Figure 10A:
FIGS. 10A-10G schematically depict idealized cross-sectional profiles for non-foamed retaining members and/or exterior foam.
Figure 10B:
Figure 10C:
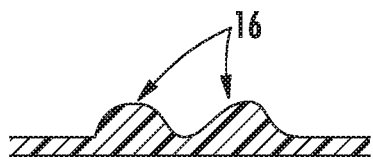
Figure 10D:
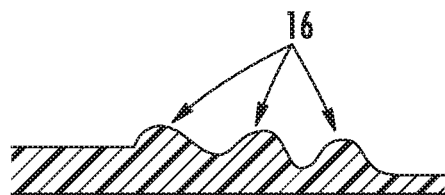
Figure 10E:
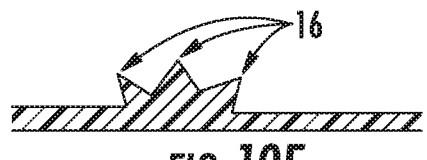
Figure 10F:
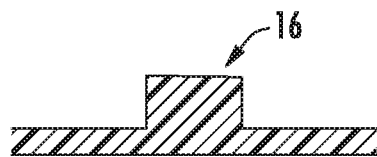
Figure 10G:
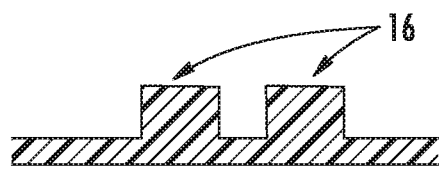

The foregoing embodiments of the composite drive shaft damper 10 can optionally include one or more wrapping layers 19 securely positioned atop the foam 14 and/or non-foamed retaining member(s) 15. In an exemplary embodiment depicted in FIGS. 9A-9B, the foam 14 and non-foamed retaining member(s) 15 are effectively sandwiched between the outer surface of the substantially cylindrical structure 11 and the wrapping layer(s) 19. The wrapping layer(s) 19 may be spirally wound plies or convolute plies of fibrous material (e.g., paper or paperboard) such as depicted in FIGS. 3A-3B. Spirally wound plies may be configured to form seam gap joints, butt joints, and/or overlap joints such as depicted in FIGS. 4A-4C. The wrapping layer(s) 19 may include one or more moisture-resistant layers (e.g., parchment paper, or polymeric film or sheet). In an alternative embodiment that excludes a non-foamed retaining member, a layer of foam (e.g., foam substantially covering the outer surface of the substantially cylindrical structure) is sandwiched between the outer surface of the substantially cylindrical structure 11 and the wrapping layer(s) 19.

It is within the scope of the present invention to tune the composite drive shaft damper to provide improved NVH reduction by reducing problematic NVH for a particular drive shaft as installed in a particular vehicle. For example, the foam's density, thickness, resilience, and durometer can be selected so as to dampen a particularly problematic resonance frequency (i.e., to provide a tuned drive shaft damper). Likewise, the retaining member's selected density, thickness, resilience, durometer, and length can be selected so as to dampen a particularly problematic resonance frequency. Similarly, the density, wall thickness, and length of the substantially cylindrical structure (e.g., a paperboard tube) can be selected so as to dampen a particularly problematic resonance frequency.

In this regard, the composite drive shaft damper 10 may employ foam in a constant or variable thickness. For example, the thickness of the foam might be varied along the cylindrical structure 11 (i.e., the foam thickness is not constant) (e.g., by applying foam strips or beads of differing thickness) in order to selectively dampen multiple (i.e., more than one) NVH-causing frequencies.

By way of non-limiting illustration, the foam 14 and substantially cylindrical structure 11 operate as a spring-mass system. Those having ordinary skill in the art will appreciate that a spring-mass system can be used to dampen vibration by moving the mass out of phase with the vibration source.

By way of further explanation, the foam 14 represents the spring, and the substantially cylindrical structure 11 represents the mass in this spring-mass system. Because the foam density and the wall thickness of the substantially cylindrical structure can be varied to dampen specific resonance frequencies, the composite drive shaft damper 10 of the present invention serves as a tuned mass damper (i.e., an active mass damper or harmonic absorber).

Those having ordinary skill in the art will recognize that, in any of these configurations, the foam 14 will bond or otherwise adhere to the substantially cylindrical structure 11 such that the foam 14 will remain in place while the composite drive shaft damper 10 is placed inside the drive shaft tube 100.

By way of further illustration, the non-foamed retaining member(s) 15 (and possibly the foam 14, too) are positioned on the substantially cylindrical structure 11 such that the protuberance or protuberances 16 extend beyond the outer surface of the substantially cylindrical structure 11.

See FIGS. 10A-10G (depicting possible foam and non-foamed cross-sectional profiles). Typically, the protuberance extends about 0.2 inch or more (e.g., between about 0.245 inch and 0.255 inch) above the outer surface of the substantially cylindrical structure 11.

Thus, the non-foamed retaining member(s) 15 (and/or the foam 14) extend above the outermost surface of the substantially cylindrical structure 11 in the form of a protuberance 16 (e.g., a protrusion on a paperboard core). See FIGS. 10A-10G. This ensures that the drive shaft damper 10 is capable of being frictionally positioned within the inner annular space of the tubular drive shaft 100.

In other words, the maximum radius of the composite drive shaft damper 10 is defined by the highest protuberance 16. Moreover, the maximum radius of the drive shaft damper 10 is greater than the radius defined by the inner annular space of the tubular drive shaft 100. As depicted in FIG. 5, the radius defined by this inner annular space refers, for example, to that part of the tubular drive shaft 100 that possesses a substantially fixed inner diameter (e.g., between a drive shaft's swaged ends). In this way, the drive shaft damper 10, once positioned within the drive shaft 100, stays frictionally secured.

Thus, upon insertion of the composite damper 10 into the drive shaft 100, the applied foam 14 and non-foamed retaining member(s) 15 are compressed between the substantially cylindrical structure 11 and the inner annular space of the tubular drive shaft 100. This helps increase the surface area of the foam 14 and/or the non-foamed retaining member(s) 15, which may improve dampening properties of the composite drive shaft damper. Similarly, the increased surface area provided by the exemplary composite drive shaft damper 10 depicted in FIGS. 9A-9B would seem to enhance the transmission of vibration into the spring-mass system, thereby providing efficient dampening of NVH.

Figure 11:
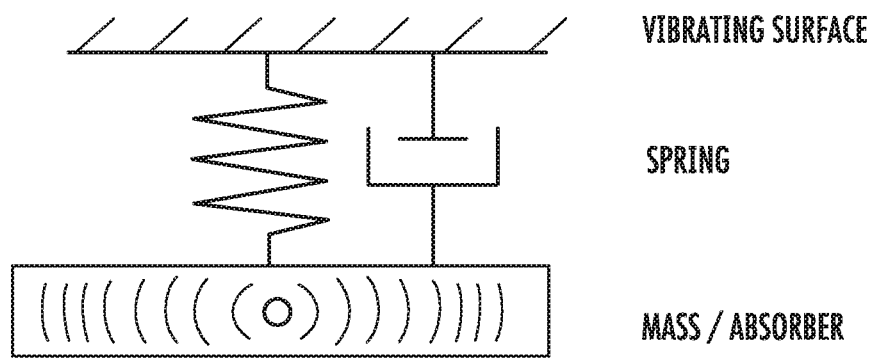
FIGS. 11-13 depict the dampening mechanisms provided by an exemplary composite drive shaft damper.
Figure 12:
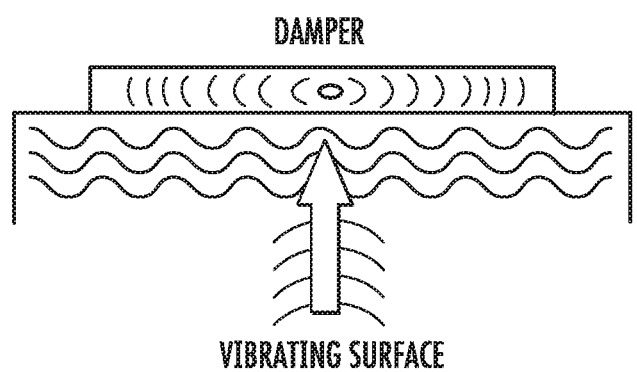
Figure 13:
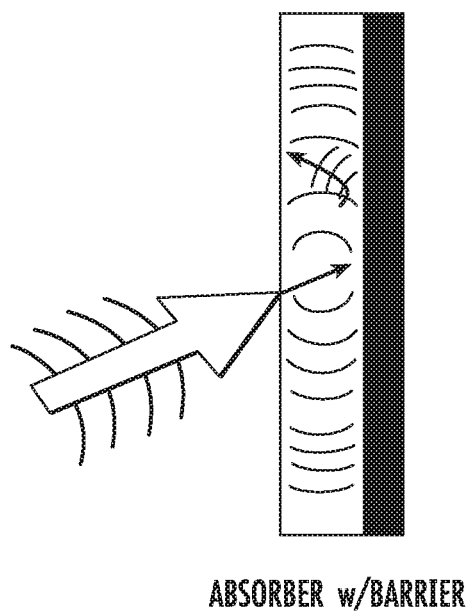

FIGS. 11-13 depict the dampening mechanisms provided by an exemplary drive shaft damper having NVH-reducing materials covering its surfaces (e.g., the outer surface or both the inner and outer surfaces). In this regard, the combination of surficial foam (e.g., polyether foam) and surficial non-foamed retaining member(s) (e.g., rubber) covering a cylindrical carrier structure (e.g., a paperboard tube) provides both active and passive dampening. As depicted in FIG. 11, the drive shaft damper provides a spring mass system whose oscillations quickly decay (e.g., due to spring rate and/or hysteresis damping) after being deflected because of contact between a vibrating drive shaft and the drive shaft damper. Although the surface foam (e.g., interior and/or exterior foam) and non-foamed retaining member(s) transmit and absorb much of the vibrational energy, the cylindrical carrier structure also functions to transmit and absorb vibrational energy, as well as to provide mass for the spring mass system. As depicted in FIG. 12, vibrational energy transmitted into the drive shaft damper is converted into heat energy (e.g., due to the flexing of the damper materials). As depicted in FIG. 13, vibrations within the drive shaft damper are continuously reflected until converted into heat energy.

Figure 14:
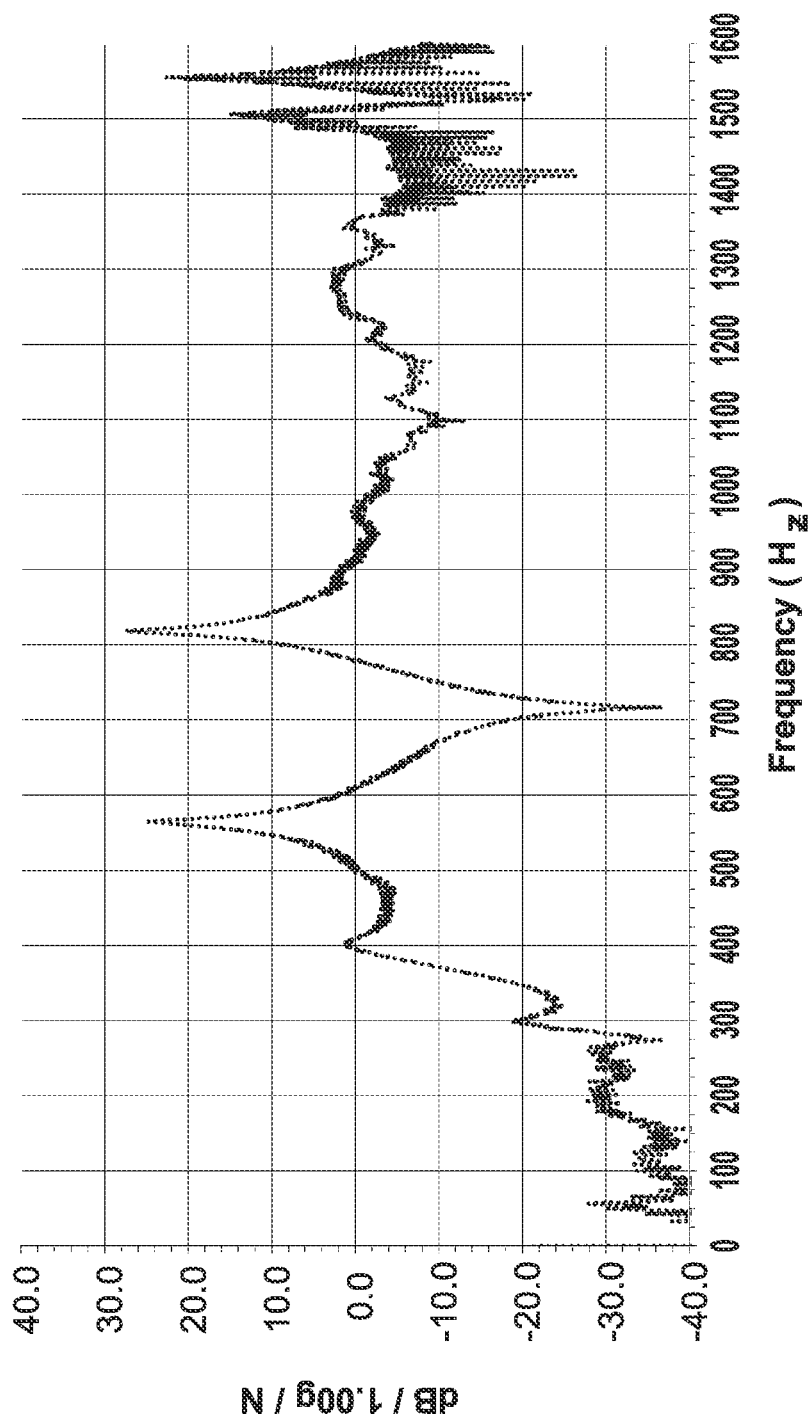
FIGS. 14-17 depict frequency-response plots for various drive shaft dampers.
Figure 15:
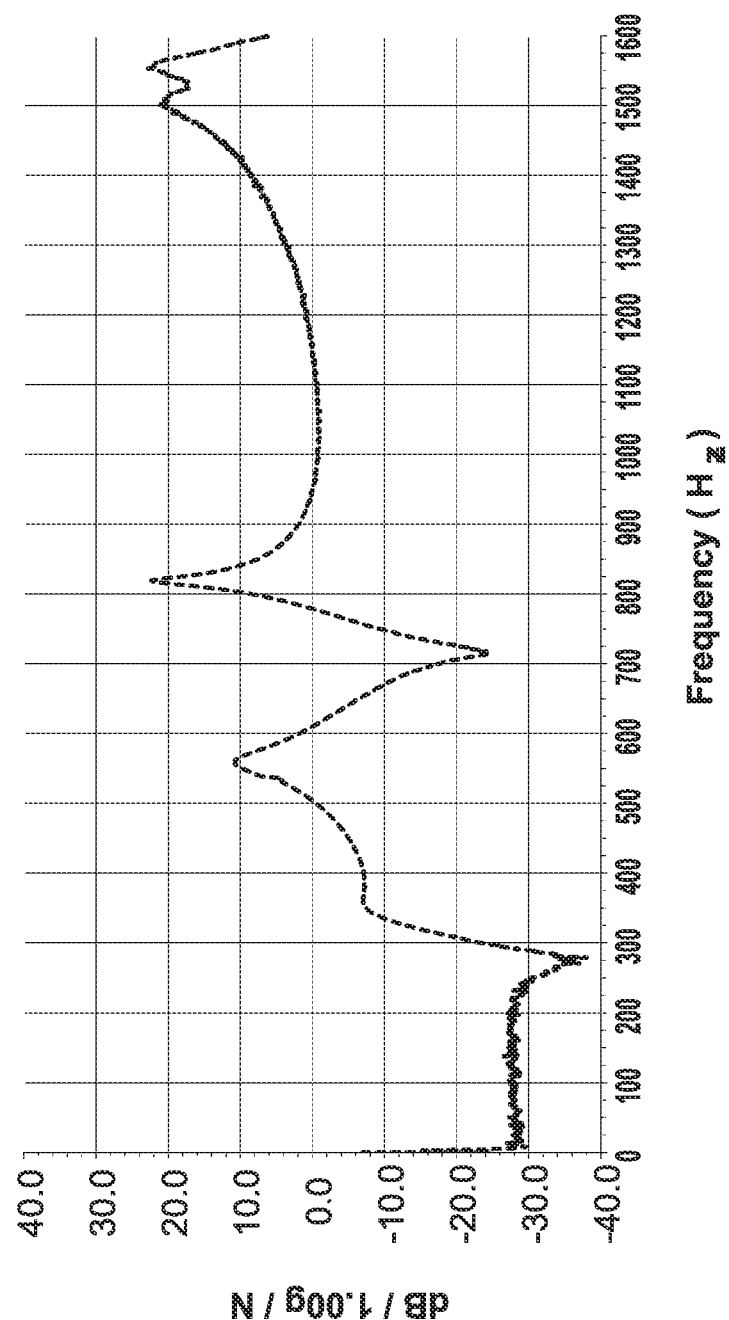
Figure 16:
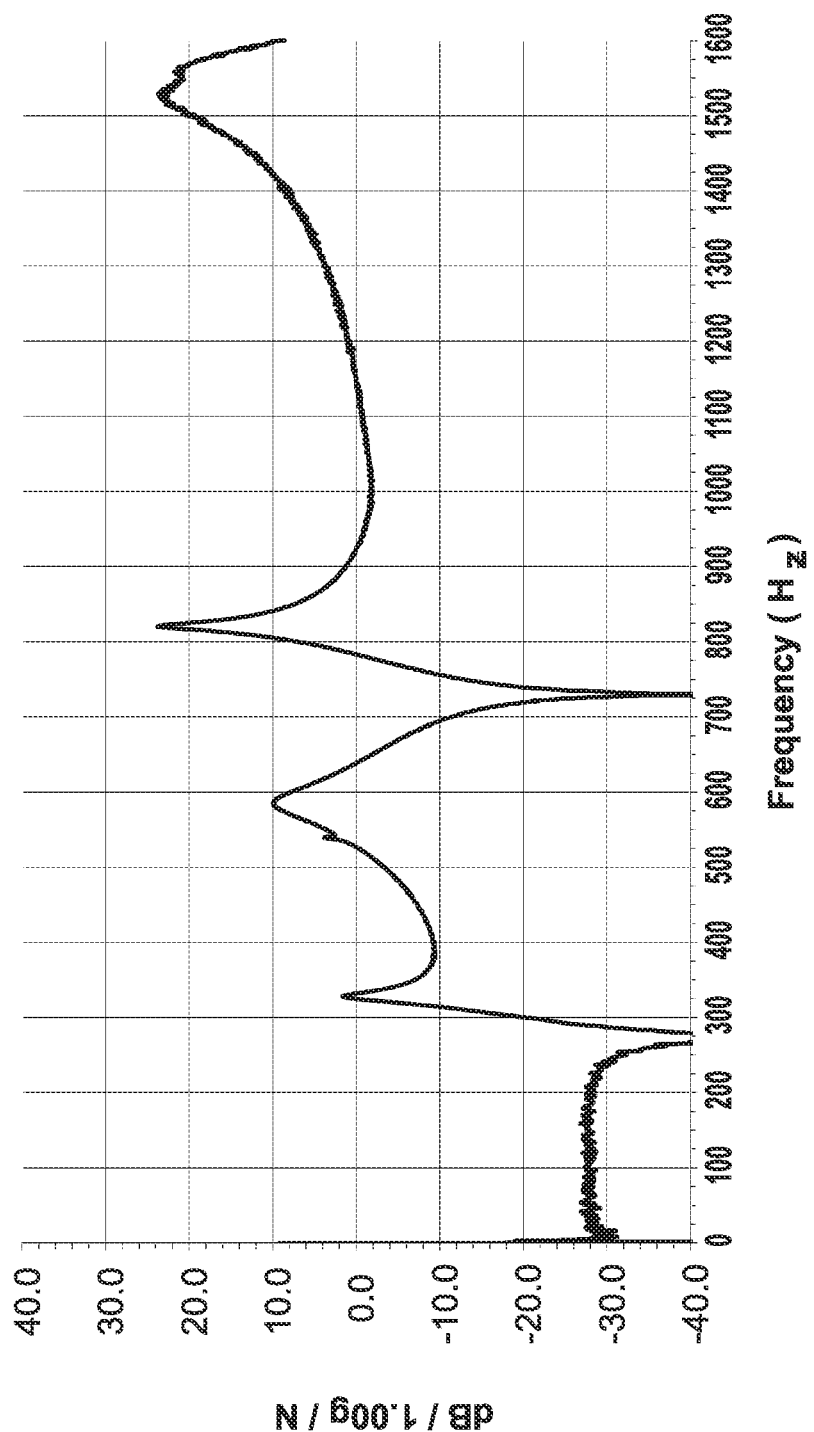

FIGS. 14-17 depict frequency-response plots for various drive shaft dampers positioned in an exemplary aluminum drive shaft (i.e., a 4×0.075×52-inch aluminum tube). Each of FIGS. 14-16 reflects testing data from two identical drive shaft dampers positioned twelve inches from each end of the 52-inch aluminum tube. For FIGS. 14-16, each of the drive shaft dampers employed a spirally wound paperboard tube as the substantially cylindrical substrate. The surficial, NVH-reducing material was different, however, for each of the drive shaft dampers whose testing data is shown in FIGS. 14-16.

FIG. 14 depicts the frequency-response plot for two drive shaft dampers, each employing two silicone rubber retaining members (i.e., a two-start configuration) in accordance with commonly assigned International Publication No. WO 2008/005863 A2 and U.S. Publication No. 2009/0048031 A1.

FIG. 15 depicts the frequency-response plot for two drive shaft dampers, each having foam substantially covering its entire outer surface in accordance with commonly assigned U.S. patent application Ser. No. 12/650,763 and commonly assigned U.S. patent application Ser. No. 13/681,851, now U.S. Pat. No. 8,801,526.

FIG. 16 depicts the frequency-response plot for two composite drive shaft dampers as depicted in FIG. 1. In other words, these composite drive shaft dampers combine both of the surficial NVH-reducing materials whose testing data are shown in FIGS. 14 and 15. In particular, each of the composite drive shaft dampers depicted in FIG. 16 include two retaining silicone-rubber retaining members that are helically affixed in parallel (i.e., a two-start configuration) along the entire length of the spirally wound paperboard tube. Foam is secured to the spirally wound paperboard tube between the adjacent helical retaining members to substantially cover the outer surface between the adjacent helical retaining members.

Figure 17:
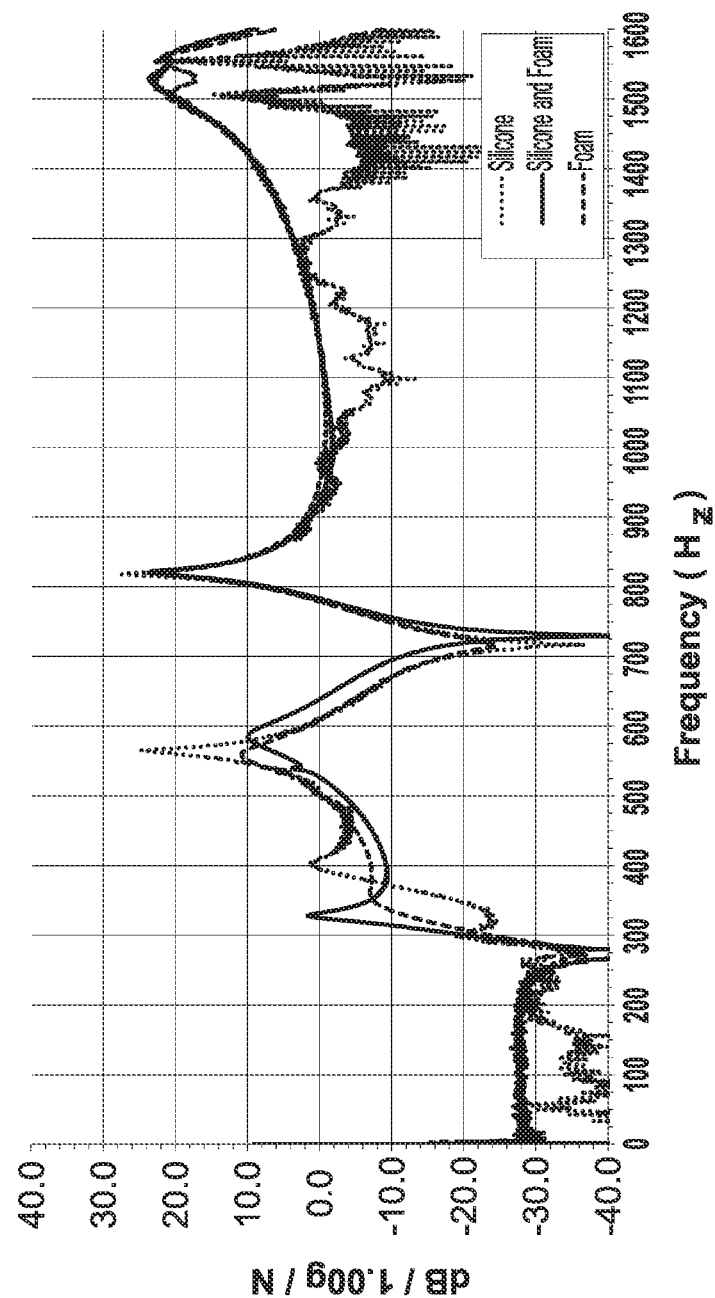

Finally, FIG. 17 depicts together the respective frequency-response plots of FIGS. 14-16, and Table 1 (below) provides comparisons of the underlying testing data of FIGS. 14-16.

TABLE 1

|  | Peak 1 | | | Peak 2 | | | Peak 3 | | |
| --- | --- | --- | --- | --- | --- | --- | --- | --- | --- |
|  | $F_P$ | $F_{MIN}$ | $F_{MAX}$ | $F_P$ | $F_{MIN}$ | $F_{MAX}$ | $F_P$ | $F_{MIN}$ | $F_{MAX}$ |
| Figure 14 two-start silicone rubber | | | | | | | | | |
| Frequency (Hz) | 399 | 387 | 431 | 565 | 556 | 572 | 818 | 807 | 832 |
| NVH (dB) | 1.25 | −3.99 | −3.92 | 24.78 | 15.52 | 15.56 | 27.45 | 13.66 | 13.6 |
| Min Max Range | | | 44 | | | 16 | | | 25 |
| Damping Ratio ($F_{MAX} - F_{MIN}$)/$F_P$ | | | 0.1103 | | | 0.0283 | | | 0.0306 |
| Figure 15 foam outer surface | | | | | | | | | |

TABLE 1-continued

|  | Peak 1 | | | Peak 2 | | | Peak 3 | | |
|---|---|---|---|---|---|---|---|---|---|
|  | $F_P$ | $F_{MIN}$ | $F_{MAX}$ | $F_P$ | $F_{MIN}$ | $F_{MAX}$ | $F_P$ | $F_{MIN}$ | $F_{MAX}$ |
| Frequency (Hz) |  |  |  | 557 | 539 | 578 | 818 | 807 | 834 |
| NVH (dB) |  |  |  | 10.66 | 6.98 | 6.97 | 22.17 | 23.69 | 12.66 |
| Min Max Range |  |  |  |  | 39 |  |  | 27 |  |
| Damping Ratio ($F_{MAX} - F_{MIN}$)/$F_P$ |  |  |  |  | 0.0700 |  |  | 0.0330 |  |
| Figure 16 silicone rubber + foam |  |  |  |  |  |  |  |  |  |
| Frequency (Hz) | 328 | 324 | 333 | 585 | 581 | 589 | 820 | 814 | 828 |
| NVH (dB) | 1.64 | −0.76 | −0.76 | 9.95 | 9.68 | 9.69 | 23.75 | 17.16 | 17.16 |
| Min Max Range |  | 9 |  |  | 8 |  |  | 14 |  |
| Damping Ratio ($F_{MAX} - F_{MIN}$)/$F_P$ |  | 0.0274 |  |  | 0.0137 |  |  | 0.0171 |  |

Table 1 and FIG. 15 show that the drive shaft damper having foam substantially covering its entire outer surface seems to eliminate the NVH peak at frequencies between 300 Hz and 400 Hz. This reaffirms the observation that, as compared to dampers having silicone rubber retaining members, foamed dampers seem to provide better reduction of NVH at lower frequencies.

Table 1 and FIG. 16 show that the composite drive shaft damper as depicted in FIG. 1 shifts downward the response frequency of the NVH peak at frequencies between 300 Hz and 400 Hz (i.e., as compared to the testing data reflected in FIG. 14 with respect to the drive shaft damper employing two silicone rubber retaining members). Table 1 and FIG. 16 also show that the composite drive shaft damper as depicted in FIG. 1 provides better NVH damping at frequencies between 500 Hz and 600 Hz (i.e., as compared to the testing data reflected in FIG. 15 with respect to the drive shaft damper having foam substantially covering its entire outer surface).

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:

1. An NVH-reducing drive shaft damper, comprising:
   a paper tube defining an inner surface and an outer surface;
   one or more non-foamed retaining members secured to the paper tube, wherein the one or more non-foamed retaining members extend above the outer surface of the paper tube; and
   one or more foam strips secured to the paper tube, wherein the one or more foam strips extend above the outer surface of the paper tube.

2. The drive shaft damper according to claim 1, comprising additional foam secured to the inner surface of the paper tube.

3. The drive shaft damper according to claim 1, wherein the one or more non-foamed retaining members are spirally wound around the paper tube.

4. The drive shaft damper according to claim 3, wherein the one or more foam strips are spirally wound around and secured to the paper tube to mostly cover the remaining outer surface of the paper tube not covered by the one or more non-foamed retaining members.

5. The drive shaft damper according to claim 1, wherein the paper tube comprises a spirally wound tube.

6. The drive shaft damper according to claim 1, wherein the paper tube comprises a convolute tube.

7. The drive shaft damper according to claim 1, wherein the paper tube comprises smooth-surface paper that defines the outer surface of the paper tube.

8. The drive shaft damper according to claim 1, wherein the paper tube comprises at least one single-faced corrugated paper ply.

9. The drive shaft damper according to claim 1, wherein one or more of the non-foamed retaining members comprise EPDM rubber.

10. The drive shaft damper according to claim 1, wherein one or more of the non-foamed retaining members comprise silicone-containing polymeric material.

11. The drive shaft damper according to claim 1, wherein one or more of the foam strips comprise elastomeric foam.

12. The drive shaft damper according to claim 1, wherein one or more of the foam strips comprise polyether foam.

13. The drive shaft damper according to claim 1, wherein one or more of the foam strips comprise silicone-containing polymeric material.

14. The drive shaft damper according to claim 1, wherein at least one foam strip possesses a substantially constant thickness over the outer surface of the paper tube.

15. The drive shaft damper according to claim 1, wherein at least one foam strip possesses variable thickness over the outer surface of the paper tube.

16. The drive shaft damper according to claim 1, wherein one or more of the foam strips comprise foam having (i) a density of 1.0 lb/ft$^3$ to 3.5 lbs/ft$^3$, (ii) an indent-force deflection at 25 percent of 28 psi to 36 psi, (iii) a tensile strength of at least 10 psi, (iv) a tear strength of at least 1.0 psi, and (v) a minimum elongation of at least 100 percent.

17. A dampened tubular drive shaft formed from the drive shaft damper according to claim 1, wherein the drive shaft damper is frictionally secured within the tubular drive shaft.

18. A vehicle comprising the dampened tubular drive shaft of claim 17.

19. An NVH-reducing drive shaft damper, comprising:
   a spirally wound paperboard tube defining an inner surface and an outer surface;
   two or more non-foamed retaining members spirally wound around and secured to the spirally wound paperboard tube, wherein the two or more non-foamed retaining members extend above the outer surface of the spirally wound paperboard tube; and two or more foam strips spirally wound around and secured to the spirally wound paperboard tube, wherein the two or more foam strips (i) extend above the outer surface of the spirally wound paperboard tube and (ii) are respectively positioned between adjacent non-foamed retaining members to mostly cover the remaining outer surface of the spirally wound paperboard tube not covered by the two or more non-foamed retaining members.

20. The NVH-reducing drive shaft damper according to claim 19, comprising one or more paper wrapping layers securely positioned atop the two or more non-foamed retaining members and the two or more foam strips, whereby the two or more non-foamed retaining members and the two or more foam strips are at least partially positioned between the spirally wound paperboard tube and the one or more paper wrapping layers.

21. The NVH-reducing drive shaft damper according to claim 19, wherein:
   the spirally wound paperboard tube comprises a plurality of spirally wound paper plies; and
   at least a portion of at least one of the non-foamed retaining members is positioned beneath at least one spirally wound paper ply.

* * * * *